United States Patent
Nixon et al.

[15] 3,666,699
[45] May 30, 1972

[54] COMPOSITIONS OF POLYSTYRENE AND POLYETHYLENE WAXES

[72] Inventors: Thomas E. Nixon; John A. Barber; Floyd B. Nagle, all of Midland, Mich.

[73] Assignee: The Dow Chemical Company, Midland, Mich.

[22] Filed: Aug. 6, 1970

[21] Appl. No.: 61,824

Related U.S. Application Data

[62] Division of Ser. No. 711,509, Mar. 8, 1968, Pat. No. 3,544,552.

[52] U.S. Cl. ............................260/23 S, 260/28.5 A
[51] Int. Cl. ...........................................C08f 33/02
[58] Field of Search ......................260/28.5 A, 235

[56] References Cited

UNITED STATES PATENTS

| | | | |
|---|---|---|---|
| 2,752,315 | 6/1956 | Kuettel | 260/23 |
| 3,355,404 | 11/1967 | Ruffing et al. | 260/23 |
| 3,224,984 | 12/1965 | Roper et al. | 260/28.5 X |

*Primary Examiner*—Donald E. Czaja
*Assistant Examiner*—Donald J. Barrack
*Attorney*—Griswold & Burdick and Richard G. Waterman

[57] ABSTRACT

This invention comprises compositions of polystyrene and polyethylene waxes, together with a lubricant or mold release agent, which compositions are suitable for making fragile molded articles useful as targets in the practice of skeet shooting.

3 Claims, No Drawings

COMPOSITIONS OF POLYSTYRENE AND POLYETHYLENE WAXES

This application is a divisional application of our co-pending application Ser. No. 711,509, filed Mar. 8, 1968 and now U.S. Pat. No. 3,554,552.

This invention concerns novel compositions of low molecular weight polystyrene and polyethylene waxes, together with a lubricant or mold release agent, which compositions can be molded to make fragile articles suitable for use as targets in practice shooting. The invention also pertains to the molded fragile articles.

It has now been found that compositions of low molecular weight polystyrene and polyethylene waxes, together with a small amount of a fatty acid sufficient to act as lubricant and mold release agent, can readily be compression or injection molded to make fragile articles suitable for use in practice shooting.

More specifically, the compositions consist essentially of from 96.7 to 99.4 per cent by weight of the polystyrene, from 0.5 to 3.0 per cent by weight of the polyethylene wax and from 0.1 to 0.3 per cent by weight of a fatty acid having from 12 to 26 carbon atoms in the molecule.

The polystyrene to be employed can have a molecular weight corresponding to a viscosity characteristic of from about 12 to about 30, preferably from 15 to 25, centipoise as determined for a 30 weight per cent solution of the polystyrene in toluene at 25° C.

The polyethylene wax can be a polyethylene having a molecular weight of from about 2,000 to 4,000. Such polyethylenes have (Brookfield) viscosities of from about 2,000 to 6,000 centipoise at 250° F. (121° C.).

The fatty acid can be an aliphatic monocarboxylic acid having from 12 to 26 carbon atoms in the molecule. Among suitable fatty acids are lauric acid, myristic acid, palmitic acid, stearic acid, arachidic acid, behenic acid, lignoceric acid and cerotic acid. Mixtures of two or more of said fatty acids can also be used. The fatty acids are preferably saturated aliphatic acids, but monoethylenically unsaturated fatty acids such as dodecylenic, palmitic, oleic, ricinoleic, petroselinic, vaccenic, linoleic, linolenic, eleostearic, licanic, parinaric, tariric, gadoleic, arachidonic, cetoleic, erucic or selacholeic, acid or mixtures thereof with one another or with the aforementioned saturated fatty acids can also be used.

The ingredients can be blended together in any usual way. For example, the polystyrene in granular or powdered form, the polyethylene in particulate or in finely powdered form and the fatty acid, can be dry blended by tumbling a mixture of the ingredients in the desired proportions in a suitable blender. The mixture of ingredients can be dry blended, compounded or mixed on compounding rolls, a Banbury mixer or in a plastics extruder.

In a preferred practice the ingredients are dry blended and fed to a plastics extruder wherein the materials are heated, pressed and mechanically worked and blended into a uniform product which is then extruded and is cooled and cut to a granular form suitable for molding.

In molding the compositions either the dry blended or the melt blended mixture of ingredients is employed to compression, injection, or screw injection mold said material into articles suitable for a desired purpose, e.g., as discs or as half-sphere shells which are usually glued together to form balls suitable for use as targets in practice shooting. It may be mentioned that for use as targets two half-sphere shells are adhered together by adhesive or solvent softening of the edges to form spheres.

The walls of the moldings suitable for use as targets in practice shooting usually have a thickness of from about 0.01 to 0.03 inch, although somewhat greater or lesser wall thickness of the moldings can be used to make fragile targets.

Small amounts of dyes, coloring agents, pigments and the like can be incorporated into the compositions to make molded articles prepared therefrom more visible, but are not required.

The following example illustrates ways in which the principle of the invention has been applied but are not to be construed as limiting its scope.

EXAMPLE

A charge of 97.75 parts by weight of granular low molecular weight polystyrene having a viscosity characteristic of 20.5 centipoise as determined for a 30 weight per cent solution of the polystyrene in toluene at 25°C., and which polystyrene had a weight average molecular weight Mw of about 45,000 and a number average molecular weight Mn of about 12,700 and 2.00 parts of "EPOLENE E," (a wax-like polyethylene having a molecular weight of about 2,500), together with 0.25 part of powdered stearic acid, was dry blended, then was fed to a plastics extruder wherein the ingredients were heated, melted and blended into a uniform composition and were extruded, cooled and cut or broken to a granular form. Portions of the product were compression molded at a temperature of about 150°C. and 500 pounds per square inch pressure to form half-sphere shells 2½ inches in diameter having walls 0.025 inch thick. The molded half-sphere shells were easily removed from the mold without sticking or breakage. Two molded half-shell spheres were solvent welded to form a sphere. The spheres were fragile objects, easily broken by dropping on the floor or by other impact. Test specimens of the spheres were shot with No. 12 (mustard seed) shot shells fired from a .22 caliber smooth bore rifle and were found to readily shatter into a great plurality of pieces upon being hit. The fragile plastic spheres were useful targets for practice of indoors shooting with pellets and fine shot.

In contrast, a similar formulation prepared from low molecular weight polystyrene having a viscosity characteristic of 34.6 centipoise and an Mw of about 61,500 and a Mn of about 21,000 was unsatisfactory.

We claim:

1. A composition of matter consisting essentially of 96.7 to 99.4 per cent by weight of polystyrene having a viscosity characteristic of from about 12 to 30 centipoise as determined for a 30 weight per cent solution of the polystyrene in toluene at 25° C. from 0.5 to 3.0 per cent by weight of a polyethylene having a viscosity between 2,000 and 6,000 centipoise at 120° C., and from 0.1 to 0.3 per cent by weight of an aliphatic monocarboxylic having from 12 to 26 carbon atoms in the molecule.

2. A composition as claimed in claim 1, wherein the aliphatic monocarboxylic acid is stearic acid.

3. A composition as claimed in claim 1, wherein the aliphatic monocarboxylic acid is behenic acid.

* * * * *